Feb. 28, 1961 J. R. THOMAS 2,972,753
MOTOR OPERATED BED DAVENPORT
Filed Oct. 3, 1955 3 Sheets-Sheet 3
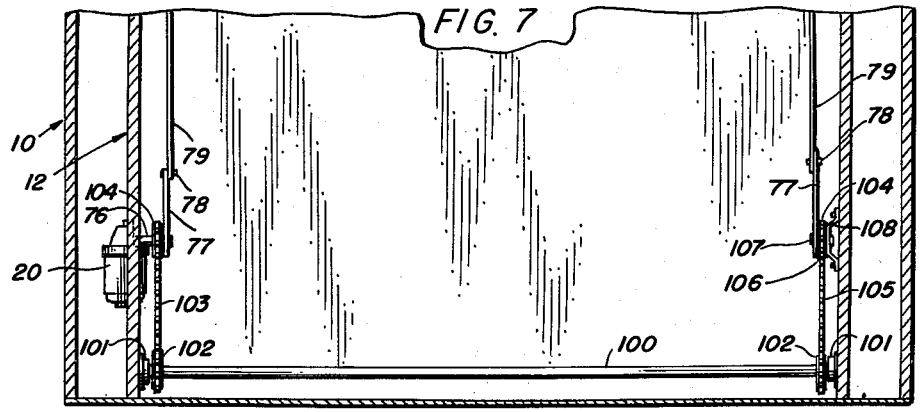
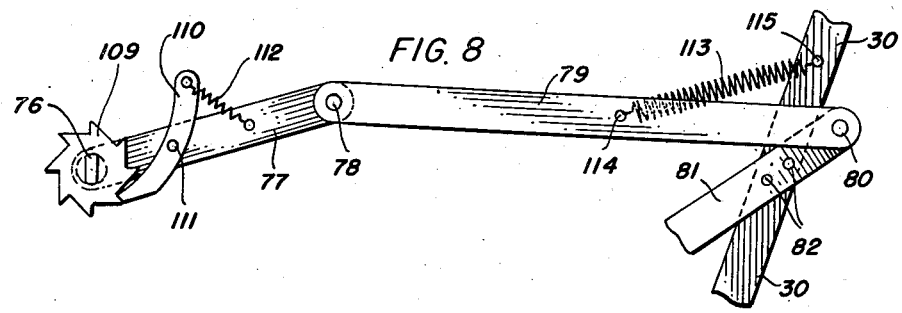
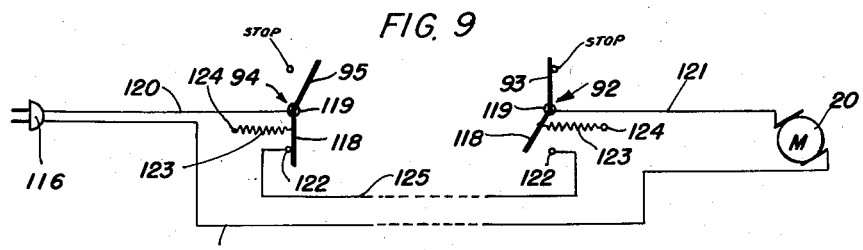
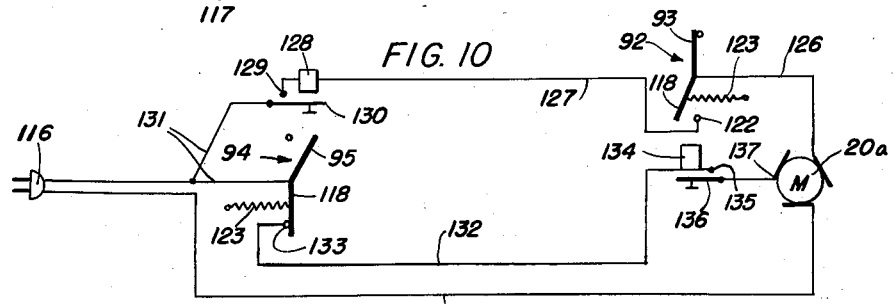
INVENTOR:
JOSEPH R. THOMAS
BY
*Kent W. Wonnell*
ATT'Y

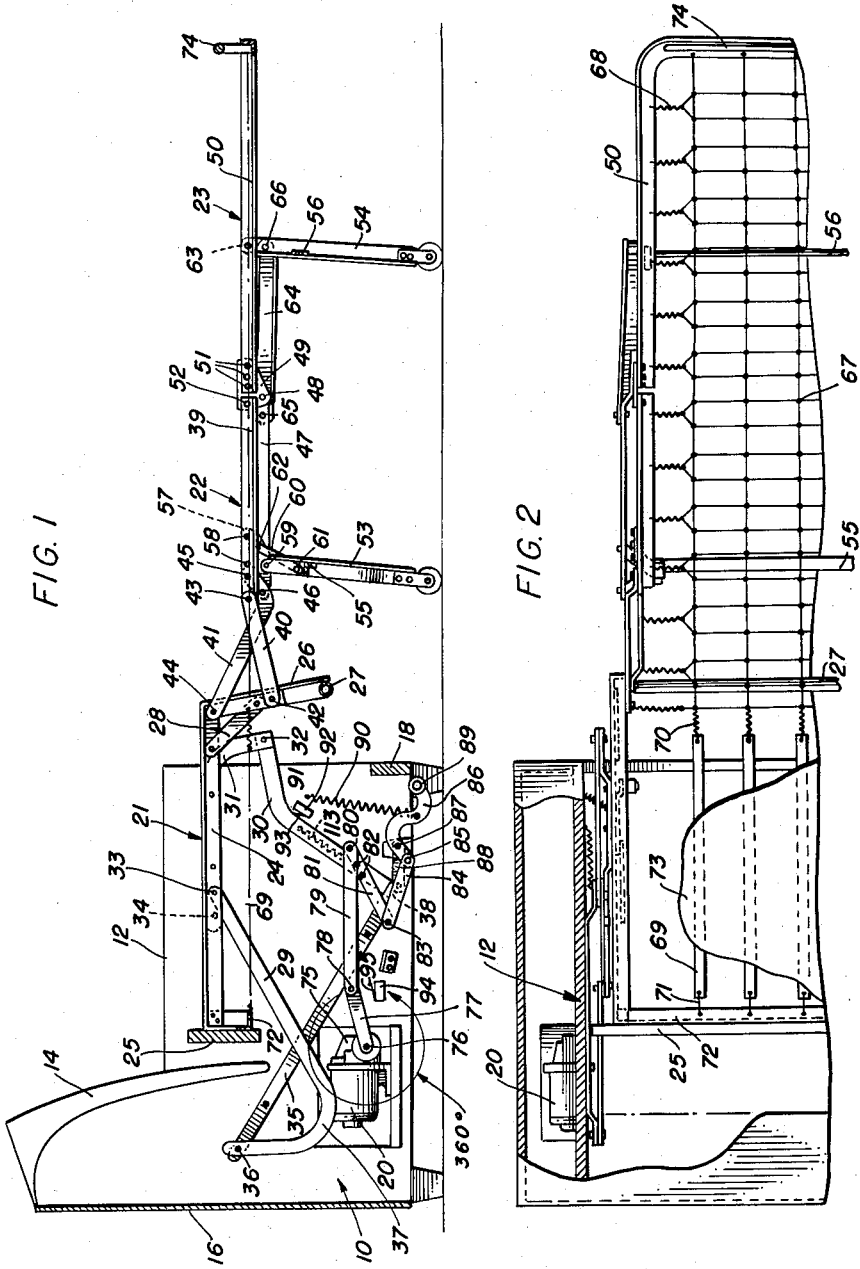

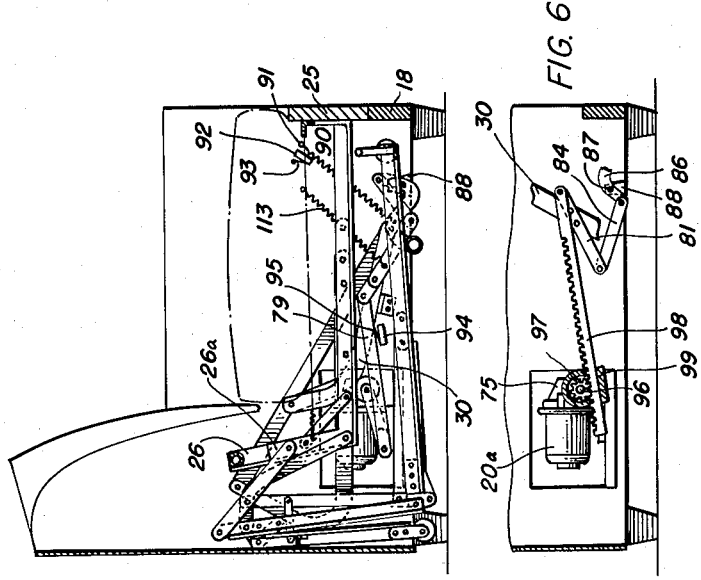
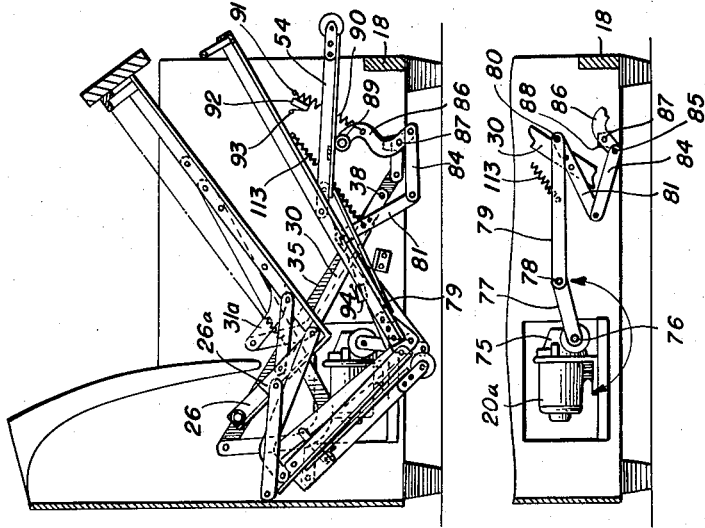

United States Patent Office 2,972,753
Patented Feb. 28, 1961

2,972,753
MOTOR OPERATED BED DAVENPORT

Joseph R. Thomas, 8348 S. Ingleside Ave., Chicago, Ill.

Filed Oct. 3, 1955, Ser. No. 538,011

11 Claims. (Cl. 5—13)

This invention relates in general to convertible furniture and is more particularly described as a bed davenport having connected sections which are unfolded from a frame to form a bed and are collapsed or folded from an extended or bed position into a folded position within the davenport frame, with this essential difference that the folding and unfolding movements are caused by the operation of a motor.

Folding bed davenports of various kinds are in common and general use, and some of them, in order to have the necessary strength and rigidity are heavy and it may not be easy for some people to operate them.

Another objection to the folding and unfolding movements of a bed davenport is that when several sections which make up the bed are extended or folded outwardly or into the frame, it requires a somewhat lengthy and continuous manual engagement and movement to effect the folding and unfolding movements, and requiring more strength than that usually possessed by some women and children who desire to operate the bed.

The present invention overcomes these objections by providing a motor, preferably electric, which is so connected to the movable parts of the bed davenport that it will positively project the bed sections in extending them from a seat frame to form a bed, and will also retract or fold the extended sections from a bed position into and within the seat frame to form a seat.

An important object of the invention is to provide a bed davenport construction having foldable sections with a motor which will extend the sections to form a bed and will fold the sections in changing a bed to a seat construction.

A further object of the invention is to provide a motor operated bed davenport in which the movement of the sections is coordinated in both the folding and unfolding movements so that no manual attention is necessary in these operations.

A still further object of the invention is to provide a folding bed davenport of the type in which a seat section is invertible rearwardly and has connected sections with means coordinating their folding and unfolding movement and having a motor connected to operate the sections in their folding and unfolding movement.

Another object of the invention is to provide a motor operated bed davenport which may be manually operated from seat position, or may be manually operated from bed position, or may be manually operated in both directions in case of a power failure.

Other objects of the invention will appear in the specification and will be apparent from the accompany drawings in which, Fig. 1 is a side view and Fig. 2 is a partial top plan view, some of the parts being shown in section, of a motor operated bed davenport in extended position to form a bed in which the motor is operated continuously in one direction in accordance with this invention.

Fig. 3 is a side view of the structure shown in Fig. 1 in a partially folded position.

Fig. 4 is a side view of the mechanism shown in Fig. 1 in a completely collapsed or folded position, forming a seat.

Fig. 5 shows a motor connection for operating the bed davenport construction in which the arm operated by the motor is reciprocated through an arc of approximately 180° in opposite directions in folding and unfolding the structure.

Fig. 6 is a motor connection including a rack and pinion for operating the bed davenport construction in opposite directions in folding and unfolding it.

Fig. 7 is a partial plan view of the structure showing a motor connection between the two sides of the bed frame.

Fig. 8 is a fragmentary view of the motor driven arm provided with a pawl and ratchet for emergency manual operation of the folding structure without the motor;

Fig. 9 is a wiring diagram of an electrical connection for intermittently operating a driving motor in one direction; and Fig. 10 is for reversing the direction of a driving motor in folding and unfolding the bed sections.

Although folding bed davenport constructions are usually counter-balanced by their mountings and by springs, it is difficult for some people to operate them, and the present invention proposes the addition of motive means preferably in the form of an electric motor which may be connected to the sections for mechanical or manual operation.

Referring now more particularly to the drawings, the foldable seat and bed structure is mounted in a seat frame 10 having side arms 12, an upholstered back 14, a back panel 16 and a cross rail or a front board 18 extending between the side arms at the lower front portion of the frame. The side arms are shown extending above the seat but upper portions of the arms may be omitted if desired as a motor 20 for operating the foldable sections is located as shown below that portion of the side arms which projects above the seat.

The foldable bed sections comprise a seat section 21, an intermediate section 22 and an outer section 23.

The seat section comprises side bars 24 connected at the front by a cross piece 25 which rests upon and registers with the front board 18 determining the position of the seat at the front of the frame in seat position. At the rear of the seat section in seat position, each side bar has an upward extension 26 connected with the opposite extension by a strengthening cross bar 27 and each extension is additionally supported by an angle brace 28 connected between the side bar 24 and an intermediate portion of the extension 26.

The seat section is the only one which is positively mounted within the frame 10 and it is mounted to swing for overturning movement upon links 29 and 30. These two links are pivoted at each end of the seat section to a bar 31 attached to the outer side of each side bar 24 and each having an upward extension 31a in the seat position with a pivot 32 to which the upper end of the forward link 30 is connected, the other link 29 having a pivot 33 by which the upper end of the link 29 is connected to the side bar 24. The movement of the rear link is limited in one direction by a stop pin 34 projecting from the bar 31 for holding the seat section in its inverted position as shown in Fig. 1.

The lower ends of the links 29 and 30 are connected to a mounting strap or bar 35, one of which is attached to each of the side arms 12, the mounting bar 35 being located at an angle extending upwardly toward the rear of the frame and having a pivot 36 near its upper end to which the end of the link 29 is connected. This end portion of the rear link 29 is preferably formed with a bend 37 which extends below the mounting bar when the seat section is in its seat or inverted position but when the seat section is in its overturning position, the high mounting of this link on the pivot 36 will throw the seat section high in the frame in front of the upholstered back and the bend 37 allows the link to extend upwardly in its overturning movement of the seat section. The other end of the forward link 30 is connected by a pivot 38 with the lower end of the mounting bar 35, but as it swings upwardly, it also raises the seat section in its overturning movement.

The intermediate section 22 has side bars 39, each connected by two links 40 and 41 to the seat section, the first link having a pivot 42 intermediate the ends of the extension 26 of the seat section and having a pivot 43 pivotally connecting it to the extremity of the side bar 39. The other link 41 is preferably in the form of a bell crank connected by a pivot 44 with the angle bar 26a attached to the extension 26 of the side bar 24 of the seat section and the other end where the bell crank is located being connected by a pivot 45 near the end of the side bar 39 of the intermediate section 22 and having a pivot 46 in the angle of the bell crank which extends below the side bar 39 in bed position and is connected to one end of a coordinating link 47.

The coordinating link at each side of the intermediate section is connected at its other end by a pivot 48 to a plate 49 which forms a hinge between the intermediate and outer sections. This plate is fixed to the inner end of a side bar 50 of the outer bed section 23 by rivets 51 and projects below the section to provide means for engagement of the rivet 48, and projects beyond the end of the side bar 50 to provide space for engagement of a pivot 52 which connects the adjacent end of the side bar 39 of the intermediate section for pivotal movement.

The intermediate and outer bed sections are each supported in bed position by legs 53 and 54 at each side of the respective sections. The legs 53 on opposite sides are connected by cross pieces 55 for joint movement and the legs 54 on opposite sides are connected by a cross piece 56. Each leg 53 has a plate 57 attached to the side bar 39 by rivets 58 or other fastening devices with a pivot 59 at the upper end of the leg 53 connecting it to a portion of a plate extending below the bar 39. In order to operate the legs 53, a short link 60 is connected by a pivot 61 at one end to the upper portion of the leg at a short distance from its pivot 59 and the other end of the link is connected by a pivot 62 with the coordinating link 47.

Each of the other pair of legs 54 is connected at its upper end by a pivot 63 with the side bar 50 of the outer bed section 23 at a point intermediate the front and rear of this section. An operating link 64 is connected by a pivot 65 at one end to the adjacent end of the coordinating link 47 close to the attachment of the mounting link at this end by means of the pivot 48, and the other end of the link 64 is connected by a pivot 66 with the leg 54 near its connection with the side bar 50.

Within the confines of the sections is a mattress supporting fabric 67 usually of metal links connected to the side bars of the sections by helical springs 68 and in the seat section are thin metal strips 69 connected to the other fabric by helical springs 70, the other end of the strips being connected by links 71 with an angle bar cross piece 72 to which the other cross piece 25 may also be connected. Covering the strips in the seat section is a strong fabric 73 which overlies the strips in the bed position as shown in Fig. 2. At the outer end of the outer section 23 is a bar 74 bent at the ends and connected to the section side bar 50 which forms a fixed head, foot or pillow rest.

As thus constructed and connected, the bed sections are adapted to fold below and partially behind the seat section in the seat position as shown in Fig. 4 and the seat section is inverted rearwardly and returned within the frame as shown in Fig. 1 as the intermediate section 22 and the outer section are extended in front of the furniture frame 10. The seat section is supported by the links 29 and 30 and the movements of the legs and the sections are coordinated by their connections with the link 41, the coordinating link 47 and the link 64 at each side of the sectional bed. In its extended position, the bed sections are locked against accidental folding movement by positioning the pivots 46 and 48 so that they will be slightly below the pivots 45 and 52 in the extended position of the bed, for example, so that in returning or folding the bed sections, the outer section 23 and the connected intermediate section 22 must be first manually lifted together to unlock the pivots 46, 48, 45 and 52 in a well known manner before the folding operation can be completed in its regulated controlled movement by the coordinating linkage.

In order to operate this construction by power means in its folding and unfolding movement, the electric motor 20 usually has a reduction gearing 75 connected to an operating shaft 76 which may be rotated continuously in one direction but only approximately one-half of a circle for each opposite movement of the bed sections or it may be operated reversely at approximately 180° as indicated at Fig. 5 or the operating shaft may be rotated several times in one direction and then several times in the other direction as indicated in Fig. 6.

Connected to the shaft 76 for rotation thereby is a power arm 77 connected at its outer extremity by a pivot 78 with one end of a link 79, the other end of which is connected by a pivot 80 with one end of a bar 81 fixably mounted by rivets 82 intermediate its ends on the lower portion of the forward link 30 upon which the seat section is mounted. At the other end of the bar 81 is a pivot 83 connecting it to one end of a link 84 which has a pivot 85 at its other end connecting it to an irregular operating lever 86, preferably somewhat S-shaped which is rotatable on the pivot 87 near one end connected to a bracket 88 secured to the side frame 12 at the bottom of the mounting bar 35. The other end of the lever 86 has a contact roller 89 for engaging the leg 54 of the outermost bed section in raising it from the folded or seat position. Connected to the lever 86 between its pivot 87 and the contact roller 89, is a coil spring 90, the other end of the spring having its extremity 91 connected to the inner side of the adjacent side arm 12.

A limit switch 92 preferably of the micro-switch type is mounted at the inner side of the adjacent side arm, has a projecting spring operating arm 93 in the path of the forward mounting link 30 at the limit of movement of the bed sections as shown in Fig. 1. At the other limit of movement, in the folded or seat position of the bed sections, a similar limit switch 94 is secured to the adjacent inner side of the side arm and has a projecting spring operating arm 95 which engages the mounting link 30 in the folded position of the bed sections as shown in Fig. 4.

These limit switches 92 and 94 are represented as having spring arms 93 and 95 which project therefrom and when engaged may operate the switch to cut off connection to the motor as hereafter described. One switch 92 may be operated to close a circuit for operating the motor 20 when the outer bed section 23 is slightly raised just sufficiently to break the pivot locking connection as above described, whereupon the motor will rotate the arm 77 upwardly drawing inwardly toward the motor on the link 79 which is connected to the bar 81 by the pivot 80, the bar being secured to the mounting link 30 by the rivets 82 corresponding raising the operating lever 86 to a position as shown in Fig. 3 in which the partially folded leg 54 is engaged as the bed sections are moved inwardly until they reach the limiting position as shown in Fig. 4. In this position, the micro-switch 94 has been engaged by the mounting link 30 which opens a circuit connection and stops the motor and the motor is not restarted until the cross piece 25 at the top of the front board 18 is slightly raised to free the arm 95 of the micro-switch from its closed contact position with the mounting link 30.

The motor operation for closing or folding the bed sections is represented in Figs. 1-4 as actuating one-half of the circumferential movement of the power arm 77 and the motor shaft 76. The extending movement of the bed sections is effected in the succeeding circular movement of the power arm in the same direction.

As represented in Fig. 5, the motor arm moves rearwardly in a lower arc of about 180° in returning or folding the bed sections within the bed and the power arm is moved forwardly from its rearmost position in a reverse arc of approximately 180° to produce the desired unfolding operation of the connected parts.

Another power operation is illustrated in Fig. 6 in which the motor 20 has a rotatable shaft 96 extending from the reduction gearing 75 and carrying a pinion 97. This pinion meshes with a rack 98 held in connection with the pinion 97 by a bracket 99 through which the rack extends which also provides a backing for holding the rack in engagement with the pinion throughout a rocking movement of the rack. In this arrangement, one end of the rack is connected directly to the power end of the bar 81 and the movement of the pinion in one direction or the other causes the corresponding movement of the power operating lever 86 to fold or extend the bed sections as previously set forth.

In all of these cases, the operation of overturning a seat swings the seat section 21 high upon the mounting links 29 and 30 so that the sections are folded and unfolded freely below the seat section and above the front board 18 even allowing for a partial spread of the legs 54 as shown in Fig. 3, and without the legs coming in contact with the front board.

In order to transfer the power movement from the motor 20 to both sides of the bed, a shaft 100 may be mounted at the lower rear portion of the frame 10 as shown more clearly in Fig. 7 by bearings 101 attached to the inner sides of the side arms 12.

Attached near the mountings are sprockets 102, one for each side of the frame, the one at the motor side being connected by a chain 103 with a sprocket 104 mounted upon the motor operating shaft 76. The sprocket 102 at the other side of the frame is connected by a chain 105 with a sprocket 106 mounted on a shaft 107 carried by a bracket 108 attached to the adjacent side arm frame. This sprocket 106 is connected to a power arm 77 corresponding to the power arm at the other side of the seat frame. In this manner, the power of the motor is transmitted to both sides of the folding bed sections so that they are operated jointly, thus producing a smooth operation which eliminates binding or swaying in folding and unfolding operations of the seat and bed sections.

In motor operated structures, it may happen that there is no current for the motor and the motor is out of order which might prevent the operation of the folding bed construction unless the motor connection is disconnected. To overcome this possibility for the construction shown in Figs. 1-4, a ratchet wheel 109 as shown in Fig. 8 may be attached to the motor operating shaft 76 to which the power arm 77 is also attached. A pawl 110 is connected to the arm 77 by a pivot 111 intermediate its ends, one end of the pawl engaging the teeth of the ratchet so that the power arm rides free on the shaft except when the ratchet is engaged by the pawl thereby permitting manual operation of the bed sections when the motor does not run. A coil spring 112 is connected from the free end of the pawl to the outer portion of the arm 77 tending to hold it in engagement with the ratchet.

A coil spring 113 has one end 114 connected to a point intermediate the ends of link 79 as shown in Fig. 8 and the other end 115 is connected to the forward mounting link 30 above the link 79 which tends to raise the remote end of the link 79 connected by pivot 78 with the power arm 77, thereby preventing the power shaft 76 and connecting link pivots 78 and 80 from being in a straight line (Fig. 1) which would make them inoperable manually when the mounting links 30 are at either end of their movements and preventing the lowering of the remote end of link 79 in Fig. 4 with similar results.

A simple form of electrical connection for the construction shown in Fig. 1 is presented in the diagram of Fig. 9 in which the limit switches 92 and 94 complete circuit connection to the motor 20 and the circuit includes a plug-in switch 116 adapted to be connected to plug-in socket with a suitable source of power with one conductor 117 which extends from the plug-in switch 116 to the motor 20. Each limit switch is represented as including a bent contact lever 118 mounted intermediate its ends upon a pivot 119 which is connected by a conductor 120 from the switch 94 to the plug-in switch 116 and the pivot of the limit switch 92 is connected by a conductor 121 with the other side of the motor 20. One end of each bent lever 118 is adapted to close against a switch contact 122 and a coil spring 123 is connected at one end to this end of the bent lever and the other end of the coil spring is connected to a fixed point 124 and tends to hold the contact lever in engagement with the switch contact. The two switch contacts for the limit switches are connected together by a conducor 125.

In operation, the bent levers 118 are represented as including the projecting spring operating arms 93 and 95 of the limit switches 92 and 94 respectively so that when in the position shown by Fig. 1, for example, with the following bed in its open or extended position, the arm 93 of switch 92 is engaged which separates the other portion of the lever 118 from its switch contact 122.

At this time, the other arm 118 of the limit switch 94 is not so engaged so that the spring 123 holds the contact portion of the arm 118 in engagement with its switch contact 122. In this position, the bed davenport sections will remain in their open position until the limit switch 92 is closed. This may be effected by slightly raising the outer bed section 23 which will cause the forward mounting link 30 to be moved slightly away from the limit switch 92 thereby allowing the switch to be closed against its switch contact 122 by the action of the spring 123. At this time, a circuit is closed to the other side of the motor through conductor 120 leading from the plug-in switch 116 through the lower arm of the contact lever 118 of the limit switch 94 through the switch contact 122 of this switch and through the conductor 125 to the switch contact 122 of the other limit switch 92, and thence through the contact arm of the lever 118 and conductor 121 to the motor 20.

The motor will be operated in closing the bed sections to folding sections as predetermined by the coordinating linkage until they are entirely within the seat frame and until the mounting link 30 engages the projecting operating arm 95 of the limit switch 94 at which time the switch arm 118 is separated from its contact 122 and the circuit to the motor is interrupted. Interruption of the motor circuit stops the motor and the foldable bed sections are confined within the seat frame until the switch 94 is closed. This switch is operated as previously set forth, by releasing the pressure of the mounting link 30 against the projecting arm 95 by slightly raising the seat section by lifting upwardly on the cross piece 25.

In the form of the invention shown by Fig. 5, it is necessary to reverse the direction of movement of the motor at each 180° travel of the motor shaft. This requires only a slight change from that shown in Fig. 9 for operating a reversible motor 20A as shown in Fig. 10. The reversing switch 92 has a conductor 126 extending therefrom to the motor. A conductor 127 extends from its switch contact 122 through a solenoid coil or relay 128 to a fixed contact 129 in the path of a switch arm 130 which is connected by a conductor 131 to one side of the plug-in switch 116. The other side of the plug-in switch is connected by the conductor 117 to the motor 20A. The other limit switch 94 is connected by a conductor 131 to one side of the plug-in switch 116 and a conductor 132 extends from its fixed contact 133 through a solenoid or relay 134 with a fixed contact 135 in the path of a switch arm 136 connected by a conductor 137 to a point on the motor 20A for reversing the direction of rotation of the motor over that closed through the contact 122.

The springs 123 tend to hold the switch arms 118 in engagement with their contacts 122 and 133 respectively and the switch arms 93 and 95 are adapted to be engaged at the ends of the movement of the davenport folding structure by the forward operating arm 20 as previously explained.

When the operating arm 93 of the limit switch 92 is engaged in the unfolded position of the bed sections as represented in Fig. 1, the connection between the operating arm of this limit switch and its fixed contact 122 is broken. Since this circuit is broken, the circuit through the relay 128 is interrupted, the relay does not attract the switch 130 to hold it in closed position against its fixed contact 129, and the operation of the motor 20A in this direction is stopped.

At this time, the switch 94 is not engaged by the link 30 and its spring 123 draws the contact arm 118 against its fixed contact 133 so that it is only necessary to move the switch 136 against its fixed contact 135 which will close a holding circuit for the switch through the relay and will also complete an operating circuit for the motor 20A to drive it in a reverse direction which will fold and close the davenport sections within the frame. At the end of this closing movement, the mounting link 30 as before engages the operating arm 95 of the limit switch 94 which separates the conductor arm 118 from its fixed contact 133, thus breaking this operating circuit for the motor and opening the circuit through the relay so that the switch 136 is opened. The switches 130 and 136 are represented as being manual switches, but they may also be operated as before explained by an initial raising of the bed sections from their outer position or from their folded seat position as previously explained.

With this construction, the engagement of the arms 93 and 95 of the limit switches is the same as previously explained but the successive operation of the limit switches 92 and 94 cause a reversal of the direction of rotation of the motor 20A. A motor reversing connection of this kind is also preferably connected for operation of the rack and pinion motor driving structure as shown in Fig. 6, with the obvious difference that instead of the operating shaft being moved only approximately 180° as shown in Fig. 5, the operating shaft 96 may be rotated a number of complete rotations to effect the necessary movement of the rack and pinion gearing.

With this construction and arrangement, it is apparent that the folding sections of a bed davenport may be extended to form a bed and may be returned from bed to seat position by the operation of a motor which is actuated by a slight manual movement of the bed or seat sections in the direction desired. Instead of actuating the limit switches in this manner to produce the operation, a separate push button might be included for each limit switch 92 or 94 which is operated by direct manual engagement or the limit switch may be remotely operated by a relay in any well known manner, producing the same result.

To guard against any failure of the operation of the motor, a pawl and ratchet connection may be included with the construction as represented in Fig. 8, which frees the supporting and operating parts from the motor driving connection to permit emergency manual operation.

While preferred constructions have been described in some detail, they should be regarded by way of illustrations and examples rather than restrictions or limitations of the invention as various changes may be made in the construction, combination and arrangement of the parts without departing from the spirit and scope of the invention.

I claim:
1. In a folded bed davenport, the combination with a davenport frame, of a seat section therefor and means mounting it in the frame for rearward overturning movement in changing from a seat to a bed, other bed sections connected to each other and to the rear of the seat section when in seat position, coordinating means connected to the seat section and to said other sections to fold them in a position behind and below the seat section in its seat position and to unfold them to a bed position in front of the seat section when it is overturned rearwardly, and motor means mounted in the frame and connected to the mounting means for selectively extending the sections in alignment in front of the frame and for folding the bed sections below the seat section within the frame.

2. A bed davenport in accordance with claim 1, comprising a circuit and source of electric current for the motor, a pair of limit switches in the path of the mounting means for opening the circuit to stop the motor in forming a seat and in forming a bed.

3. A bed davenport in accordance with claim 2, in which the limit switches supported on the sides of the frame are in the circuit and have extending switch operating arms engaged by pivoted supporting links of the mounting means in opposite directions of movement to stop the motor at the seat or bed forming limit.

4. In a motor operated bed davenport in accordance with claim 3, the switch arms extending from the switches and closing a connection in the circuit when so extended, the switches being arranged to open the circuit when engaged by the mounting means near the limit of movement thereof in either direction of movement of the bed sections.

5. A motor operated bed davenport in accordance with claim 1, including a rotatable motor shaft and a connected operating arm and a link and lever connection with the mounting means, the latter including a projecting operating arm to engage the lowermost section for raising and lowering the sections, the motor being rotatable continuously in one direction to alternately extend and withdraw the sections in successive movements of the motor.

6. In a motor operating bed davenport in accordance with claim 1, the motor means including parts connected with the motor and one of the sections for alternately projecting the sections forwardly to form a bed when the motor rotates in one direction and to withdraw the sections from bed position to form a seat when the motor is rotated in the opposite direction.

7. A motor operated bed davenport in accordance with claim 6, in which the motor connection comprises a rack and pinion connected between the motor and the said sections.

8. A motor operated bed davenport in accordance with claim 6, in which the motor means includes a pair of limit switches operated by contact with the mounting means and a motor that is reversible in direction and a circuit between the limit switches of the motor having a cross connection to reverse the direction of the motor when either limit switch is closed for operation of the motor after the circuit for the motor has been opened by the other limit switch.

9. A bed davenport in accordance with claim 1, in which the motor means includes a one way power drive between the motor and the mounting means which is manually operable in the same direction if the motor fails.

10. A motor operated bed davenport in accordance with claim 1, in which the motor has a rotatable shaft, a power arm rotatable on the shaft, a pawl and ratchet connection between the shaft and the power arm to insure operation by the motor in one direction of rotation and to permit manual operation of all of the parts except the motor in the same direction of rotation when the motor fails.

11. A motor operated bed davenport in accordance with claim 10, in which a link is pivoted at one end to the end of the power arm and near its other end upon said mounting means, the pivot connection between the link and the power arm being normally raised above the center line between the connections at the other ends of the link and the shaft end of the power arm, and a spring connected at one end to the link intermediate its pivots and connected at the other end to the mounting means so that the spring tends to hold the said pivot to one end side of the center line connecting them and thereby to prevent the operating arm and the link from assuming an inoperative position.

References Cited in the file of this patent

UNITED STATES PATENTS

| | | |
|---|---|---|
| 1,480,451 | Koch | Jan. 8, 1924 |
| 1,714,111 | Staufenbiel | May 21, 1929 |
| 1,978,902 | Jackson | Oct. 30, 1934 |
| 2,007,988 | Thomas | July 16, 1935 |
| 2,349,701 | Buttikofer | May 23, 1944 |
| 2,500,742 | Taylor | Mar. 14, 1950 |
| 2,566,983 | Coltrane | Sept. 4, 1951 |
| 2,592,166 | McLean et al. | Apr. 8, 1952 |
| 2,608,697 | Condemi | Sept. 2, 1952 |
| 2,609,863 | Paulich | Sept. 9, 1952 |
| 2,841,800 | Thomas | July 8, 1958 |